Feb. 10, 1942.    W. L. McGRATH    2,272,871
ABSORPTION HEATING SYSTEM
Filed Jan. 10, 1938
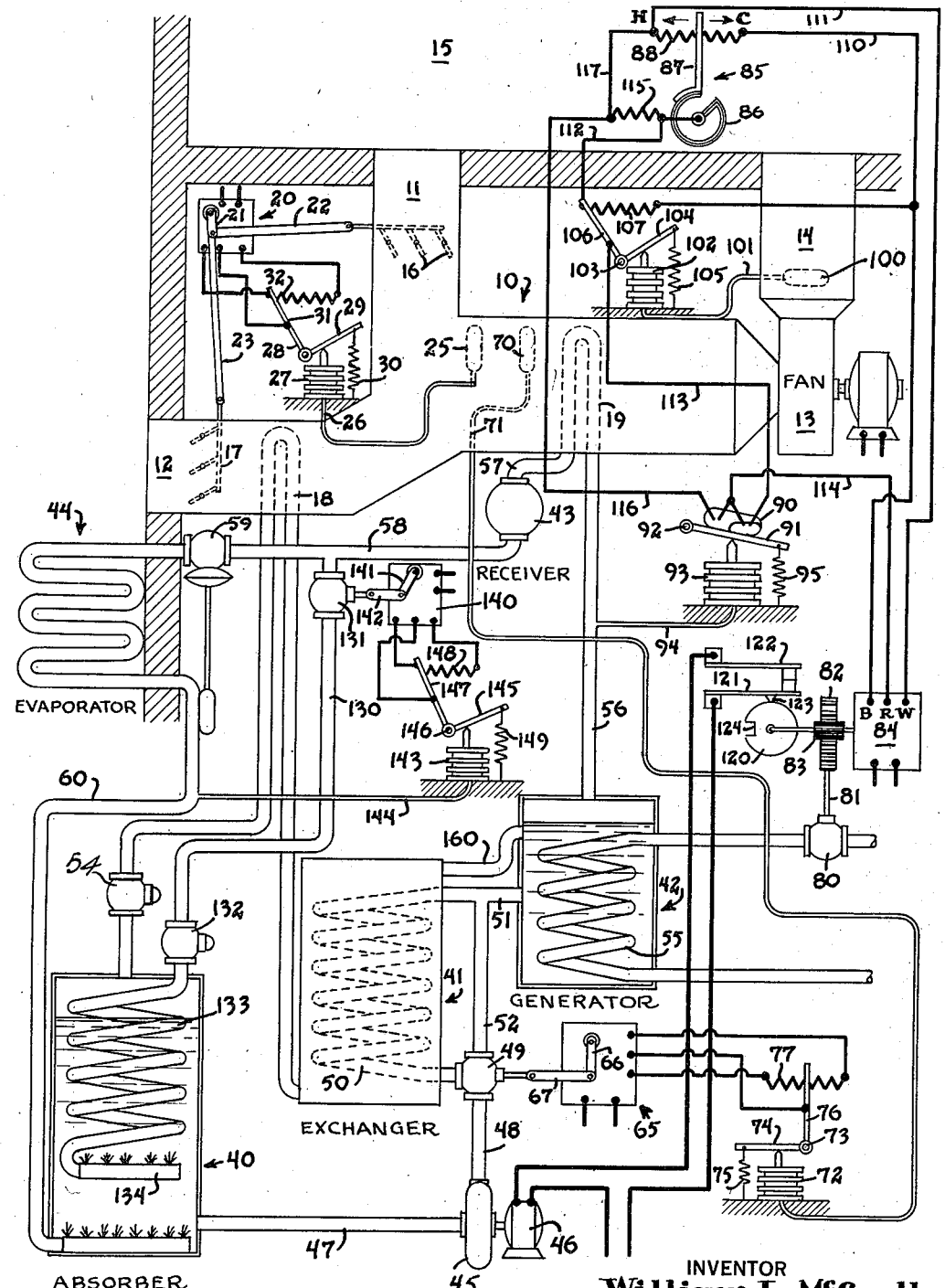
INVENTOR
William L. McGrath
BY George H. Fisher
ATTORNEY Patented Feb. 10, 1942

2,272,871

UNITED STATES PATENT OFFICE 2,272,871

ABSORPTION HEATING SYSTEM

William L. McGrath, St. Paul, Minn., assignor to Minneapolis-Honeywell Regulator Company, Minneapolis, Minn., a corporation of Delaware Application January 10, 1938, Serial No. 184,173

27 Claims. (Cl. 62—5)

This invention relate to a heating system, and more particularly to a heating system wherein an absorption type refrigeration system is employed for transferring heat from a heat source such as outside air to a space being heated.

It is an object of this invention to provide in such a system improved control means by means of which a predetermined temperature may be maintained in the space being heated.

More specifically, it is an object of this invention to provide a heating system wherein air is continuously recirculated through a space to be heated and past a heating means which is the condenser of an absorption refrigeration system, the evaporator of which is located outside of the space to be heated, wherein fresh air is continuously mixed with the recirculated air and in which the fresh air is preheated and the absorber of the absorption system is cooled by circulating the weak liquor from the exchanger, through the path of fresh air, and into the absorber.

A further object of the invention is in the provision of means whereby the strong liquor passing from the absorber to the generator may be by-passed around the exchanger when it is desired to increase the preheating of the fresh air by reason of lowered outside temperatures.

Another object is in the provision of means whereby some of the refrigerant may be passed from the receiver directly into the absorber when outside temperatures are so low that sufficient heat cannot be taken from outdoors to provide sufficient heating, whereby the amount of refrigerant circulated is increased and the amount of heat which may be supplied to the generator and transferred to the space to be heated may be increased.

Further objects will become apparent upon a study of the specification and claims in connection with the accompanying drawing, in which is illustrated a schematic view of my improved system.

Referring to the drawing a heating chamber is represented generally by the reference character 10, this heating chamber including inlet ducts 11 and 12, fan 13, and an outlet duct 14. Duct 11 constitutes a return air duct. Fan 13 circulates air through the chamber 10, duct 14 through a space 15 to be heated and back through the return air duct 11. Fresh outdoor air is drawn into the system through the duct 12. Dampers 16 and 17 are positioned in the return air duct 11 and fresh air duct 12, respectively, whereby the proportion of fresh and return air circulated by the fan may be controlled.

Positioned in the fresh air duct 12 is a heating coil 18 for preheating the fresh air entering the heating chamber 10. The mixture of fresh and return air is heated by a heating coil 19 which forms a condenser of the absorption heating system as will be hereinafter described.

The operation of dampers 16 and 17 is controlled by a motor 20 which motor includes an operating arm 21 connected by means of links 22 and 23 to the dampers 16 and 17, respectively. For controlling the operation of motor 21, a bulb 25 is located at a point where the preheated air and the return air are mixed, this bulb being connected by means of a capillary tube 26 to a bellows 27, said bulb, tube, and bellows being filled with a volatile fluid, which, upon a rise in temperature of the mixed air will cause an expansion of the fluid and accordingly, an expansion of the bellows 27. A bell crank lever pivoted at 28 includes an arm 29 which is moved by the bellows 27 and held against the bellows by means of a tension spring 30. The other arm 31 of the bell crank lever cooperates with a potentiometer resistance 32 and as will be apparent, is caused to move across the resistance in response to temperature changes as measured by the bulb 25. The motor 20 may be a proportioning motor of the type illustrated in Patent 2,028,110 granted January 14, 1936, to D. G. Taylor and its operation is controlled by the potentiometer 32 in the manner set forth in this patent. Since the construction of this motor forms no part of the present invention, its internal construction is not illustrated herein. Movement of arm 31 to the right over the resistance 32 will take place as the mixed air temperature decreases and will cause rotation of arm 21 of the motor 20 in a counterclockwise direction, whereby the dampers 17 are moved towards closed position and the dampers 16 towards open position, the extent of movement of the arm 21 being determined by the position of arm 31 on the resistance 32.

Arm 31 will normally be positioned at the extreme left of resistance 32, in which position arm 21 of motor 20 is in one extreme position and the dampers 16 and 17 are each open a fixed amount, for example, 50%. That is, the amount of fresh and return air entering chamber 10 is subtantially the same. The arrangement is such that no movement of arm 31 and accordingly, no movement of the dampers will take place unless the mixed air temperature falls to a predetermined value, as, for example, 60° F. The coil 18 is controlled, as will be hereinafter explained, to maintain the temperature of the mixed air at a slightly higher value, as for example, 62° F. If this coil is unable to maintain this temperature, by reason of the low temperature of the fresh air passing through duct 12, so that the temperature falls to 60° F., dampers 17 will gradually be closed and dampers 16 will gradually to opened to lessen the proportion of fresh air circulated, so that the temperature of the mixed air will never fall below a minimum temperature of substantially 60° F. for example. As long as the temperature of the mixed air is above 60° F. however, no adjustment of the dampers will take place and the arm 21 of motor 20 will be in one extreme position in which the fresh air dampers are at their maximum open positions. It should be understood that this position of the dampers need not necessarily be 50% open, and any suitable position may be chosen by suitable choice of linkage between the motor and the dampers. Also the temperature at which the fresh air dampers start to close need not be 60° F., but any suitable value to suit the particular requirements may be chosen.

For supplying heat to the coils 18 and 19 an absorption system is provided. This system includes an absorber 40, an exchanger 41, a generator 42, the condenser 19, a receiver 43, and an evaporator 44. A pump 45 driven by means of a motor 46 is provided for pumping liquor from the absorber through a pipe 47 and into the generator through a pipe 48, a three-way valve 49, a coil 50 in the exchanger, and a pipe 51. This pump also serves to raise the pressure of the liquid from the low pressure existing in the absorber to the high pressure in the generator. Valve 49 is also connected directly to the generator by means of a pipe 52. The valve 49 in one extreme position causes all the liquor from the absorber to flow through the exchanger coil 50 into the generator, and in its other extreme position causes all the liquor to by-pass the exchanger and flow directly to the generator. In its intermediate positions the valve 49 causes the liquor to flow both through the exchanger to the generator and directly to the generator, the amount of liquor that by-passes the exchanger depending upon the position of the valve.

Generator 42 is provided with a steam coil 55 for heating the liquor in the generator and evaporating the ammonia therein which evaporated ammonia passes upwardly through a pipe 56 through the condenser 19 where it is liquified and from there into the receiver 43 by means of a pipe 57. The ammonia being condensed in the condenser 19 gives off heat to the air in the heating chamber 10 and provides the main heat supply for the heating chamber. From the receiver 43 the liquid ammonia flows through a pipe 58, an expansion valve 59 into the evaporator 44 which may be located outdoors. Heat is picked up from the outdoors in the evaporator by evaporation of the ammonia and the evaporated ammonia then passes through a pipe 60 into the absorber where it is mixed with the liquor in the absorber. The weak liquor remaining in the generator after the ammonia has been evaporated therefrom flows back through the exchanger to the absorber, the weak liquor flowing through pipe 160 into the exchanger and thence through the preheating coil 18 where it is cooled by the fresh air passing through duct 12. A pressure reducing valve 54 is provided in the connection between the preheating coil 18 and the absorber in order that the pressure of the solution in the absorber will be at least as low as the pressure of the ammonia in the evaporator 44. It will be understood that the liquor is quite hot when it enters the exchanger and some of the heat will be given off to the strong liquor passing from the absorber to the generator, which liquor is relatively cool, the amount of heat exchange depending upon the position of valve 49 and the remaining available heat in the weak liquor given off to the fresh air passing through duct 12, so that upon entering the absorber this weak liquor is relatively cool. The ammonia entering the absorber from the evaporator goes into solution in the weak liquor and accordingly the liquor drawn from the absorber through pipe 47 is a strong liquor. To briefly review the operation of the system so far described, it will be seen that heat is supplied to the strong liquor in the generator which causes evaporation of the ammonia therein, this ammonia being condensed in the coil 19 thus giving off heat in the heat chamber 10, the liquid ammonia then passing through the receiver 43 and from there through the expansion valve 59 into the evaporator 44, the ammonia requiring heat to be evaporated, which heat is taken up from outdoors, the evaporated ammonia then passing into the absorber from the evaporator which is being continuously supplied with weak liquor passing from the generator through the exchanger and the coil 18, the ammonia being dissolved in the weak liquor in the absorber and thereby forming a strong liquor which is then pumped from the absorber back to the generator.

A proportioning motor 65 similar to the motor 20 is provided for positioning the three-way valve 49, this motor including a control arm 66 connected by means of a link 67 to the valve 49. Mounted in the heating chamber at a point where the fresh and return air are mixed, and in proximity to bulb 25, is a bulb 70 filled with a volatile fluid and connected by means of a capillary tube 71 to a bellows 72. A bell crank lever pivoted at 73 includes an arm 74 which is operated by the bellows 72 and maintained in engagement with the bellows by means of a tension spring 75. The other arm 76 of the bell crank lever is arranged to sweep across a control potentiometer resistance 77 for the motor 65. As will be apparent, a rise in the temperature of the mixed air affecting the bulb 70 will cause an expansion of the bellows 72 and movement of arm 76 to the right across the potentiometer resistance 77. This will cause movement of arm 66 in a direction to cause valve 49 to increase the flow of liquor through the exchanger and decrease the amount which is by-passed, the amount of movement of said valve being proportional to the extent of movement of said arm 76, which is in turn proportional to the change in temperature of the mixed air. If the temperature of the mixed air is high enough to cause the arm 76 to be moved to the extreme right of resistance 77, valve 49 will be positioned so that all the liquor must flow through the exchanger coil 50 on its way to the generator. Conversely, should the temperature of the mixed air become low enough to cause the arm 76 to be moved to the extreme left of resistance 77, the valve 49 will be so positioned that all the liquor flowing to the generator will by-pass the exchanger. The purpose of this will be hereinafter set forth.

A valve 80 is provided for controlling the amount of steam supplied to the generator 42, this valve including a stem 81 which may be connected to a rack 82 cooperating with a gear 83 driven by a proportioning motor 84, which motor may be similar in construction to the motor 20. Controlling the motor 84 is a thermostat 85 which may comprise a bimetallic element 86 and an arm 87 which is arranged to sweep across a resistance 88. This thermostat is located in the space 15 being heated and arm 87 is caused to move to the left in response to rises in temperature in the space, and to the right in response to a fall in temperature in the space. Although a space temperature responsive controller is shown, a return air responsive controller may be used since a measure of return air temperature passing through the duct 11 is a measure of the temperature of the air in the space being heated.

Also controlling the motor 84 is a mercury switch 90 mounted on an arm 91 pivoted at 92, the arm being operated by a bellows 93 connected by means of a pipe 94 to the outlet pipe 56 from the generator 42. Arm 91 is urged downwardly by means of a spring 95. Mercury switch 90 will normally assume the position illustrated, but should the pressure within the generator rise to a high enough value, the bellows will be expanded sufficiently to cause arm 91 to move upwardly about pivot 92 sufficiently to cause the mercury switch 90 to be tilted in the opposite direction.

A third control element for the motor 84 comprises a bulb 100 which is located in the discharge duct 14, this bulb being connected by means of a capillary tube 101 to a bellows 102 and being filled with a volatile fluid whereby the bellows 102 is caused to expand or contract as the temperature of the heated air in duct 14 increases or decreases. A bell crank lever pivoted at 103 includes an arm 104 operated by the bellows 102, the arm being held against the bellows by means of a spring 105. A second arm 106 of the bell crank lever is arranged to move across resistance 107. This arm 106 will normally be maintained in the position illustrated, but if the temperature of the air leaving fan 13 should drop to a low enough value such as 65° F., bellows 102 will contract and arm 106 will move to the right across resistance 107.

Motor 84, as will be understood upon a study of the Taylor patent aforementioned, includes a pair of field windings, the energization of one winding causing rotation of the motor in one direction and the energization of the other winding causing rotation of the motor in the opposite direction. A pair of relay coils are provided for controlling the selective energization of the two windings, these coils being connected together at one end, this junction being connected to the terminal R on the motor. The other ends of the relay coils are connected to terminals W and B. The terminal R on the motor is connected directly by means of conductor 114, mercury switch 90, conductor 113, arm 106, and conductor 112 to the thermostat 85 when switch 90 and arm 106 are in the positions illustrated. Terminals B and W are connected to opposite ends of the resistance 88 by means of conductors 110 and 111, respectively. It is accordingly seen that the thermostat and the resistance forms a control potentiometer which is connected in parallel with the relay coils inside the motor. Disregarding the other control members for the time being it will be understood that movement of arm 87 of the thermostat 85 across the resistance 88 to the right or to the left will cause the relative currents flowing through the relay coils to be varied and accordingly the motor will be caused to rotate in one direction or the other according to the direction of arm 87 over resistance 88 which in turn causes the valve 80 to be moved towards open or closed position. Arm 87 moves toward the left in response to a rise in temperature in the space 15 and causes said motor to rotate in a direction to move the valve towards closed position and movement of arm 87 toward the right causes rotation of the motor in the opposite direction. Also provided in the motor is a balancing potentiometer connected to the relay coils in parallel with the potentiometer above described. This balancing potentiometer includes an arm operated by the motor which is moved in a direction to balance the effect of the movement of arm 87 so that after the motor has rotated an amount corresponding to the position of arm 87 on resistance 88, the arm of the balancing potentiometer will have moved a corresponding distance in a direction to oppose the effect of the control potentiometer, thus causing balancing of the relay coils in the motor and causing the motor to stop. It will therefore be understood that the amount of rotation of the motor and therefore the amount of opening or closing of the valve 80 will correspond to the extent of movement of arm 87 over resistance 88.

The resistance 107 across which arm 106 moves is connected between the terminals R and B of the motor as is apparent from the drawing, the connection to the terminal R being through arm 106 and switch 90. This controller is a low limit controller and is so arranged that arm 106 will be in the extreme left position as illustrated unless the temperature of the air in duct 14 drops to a predetermined value such as 65° F. Normally, therefore, the arm 106 will remain in the position illustrated and in order that resistance 107 will not affect the operation of the motor 84 when the arm is in this position as controlled by the thermostat 87, a second resistance 115 is connected between the thermostat and the left end of resistance 88 or in effect, between the R and W terminals of the motor when the arm 106 is in the position illustrated. This resistance is chosen so that it has the same resistance value as resistance 107 and accordingly, when the arm 106 is in the extreme left position the effect of resistance 107 is balanced by resistance 115. If now the arm 106 is caused to move toward the right over resistance 107 in response to a drop in temperature in the duct 14 to 65°, the resistance between the R and B terminals is lessened and the resistance between the R and W terminals is increased according to the amount of movement of arm 106 over the resistance 107. This has the effect of desensitizing the resistance 88 because of the parallel relationship of the resistances, so that movement of arm 87 of thermostat 85 has less effect on the motor, the effect being lessened according to the amount of deflection of arm 106 toward the right. Movement of arm 106 toward the right also causes the motor to operate to move the valve 80 toward open position until the balancing potentiometer within the motor has balanced the effect of the movement of arm 106. Since the effect of thermostat 85 is lessened by the desensitizing effect of the arm 106 moving toward the right it will be clear that the temperature of the air passing through the duct 14 will be maintained above a certain predetermined value regardless of the temperature within the space 15.

The mercury switch 90 acts as a limit controller and when the pressure within the generator reaches a high predetermined value the arm 91 is moved upward about the pivot 92 by the bellows 93 until the mercury switch 90 is tilted in the opposite direction from that illustrated. The R and W terminals of the motor are now connected directly together by means of conductors 114, 116, 117, and 111 so that there is now no external resistance between these terminals and the motor is therefore caused to run to one extreme position before the balancing potentiometer within the motor is able to cause the current through the relay coils to become rebalanced, in which position the valve 80 is entirely closed.

Normally therefore with arm 106 and the mercury switch 90 in the positions illustrated, the thermostat 87 is the sole control for the motor 84 and the valve 80, the valve being adjusted to maintain a predetermined temperature within the space 15 by varying the heat input to the generator and accordingly the heat available in coil 19. Bulb 100 operates to prevent the temperature in duct 14 from dropping below a predetermined value and if the temperature drops to a predetermined value, desensitizes the effect of thermostat 87 whereby this predetermined value may be maintained regardless of the temperature in the space 15. This is for the purpose of preventing the air being circulated through the room from dropping to such a low value as to cause discomfort to the occupants of the room as would result if air having too low a temperature were circulated therethrough. Mercury switch 90 acts as a high limit control, preventing the attainment of excessive pressures in the generator 42 and causing the motor to entirely close the valve 80 upon the attainment of a high predetermined pressure within said generator.

Also operated by the motor 84 is a cam 120 controlling switch arms 121 and 122, these switch arms controlling the current to the motor 46 as will be apparent. Switch arm 121 is provided with a projection 123 which will move into the recess 124 of cam 120 when the motor 84 is operated to cause valve 80 to close. It follows then that when the supply of steam to the generator is shut off, the circulating pump 45 is stopped.

Leading from pipe 58 which connects the receiver 43 to the expansion valve 59 is a pipe 130 controlled by a valve 131, which pipe leads through an expansion valve 132 into a coil 133 located within the absorber, this coil terminating in outlet jets 134. Valve 131 is controlled by a proportioning motor 140 of construction similar to the motor 20, this motor including a control arm 141 connected by means of a link 142 to the valve 131. This motor is controlled by means of a bellows 143 connected by means of a tube 144 to the outlet pipe 60 of the evaporator. Bellows 143 operates an arm 145 of a bell crank lever pivoted at 146, said lever being connected to the potentiometer resistance 148. Spring 149 maintains arm 145 in engagement with bellows 143. Movement of arm 147 across the resistance 148 to the right causes operation of motor 140 to open valve 131 an amount which is in proportion to the extent of movement of the arm 147. This arm will not be moved until the pressure within the pipe 60 falls to a sufficiently low value.

*Operation*

With the parts in the positions illustrated the fresh air dampers are so positioned that the amount of air passing through ducts 11 and 12 is substantially the same. Valve 80 is in its middle position, that is, the amount of steam passing through the generator is about 50% of the maximum. The valve 49 is positioned to allow substantially equal amounts of liquor to pass directly into the generator and to pass through the exchanger into the generator. Valve 131 is entirely closed so that no ammonia bleeds directly from the receiver into the absorber.

By reason of the fact that some of the liquor is pumped from the absorber directly into the generator the temperature of the liquor entering the generator is lower than if all the liquor entering the generator passed through the exchanger, since the weak liquor passing into the exchanger by means of the pipe 160 is at a high temperature and the liquor leaving the absorber is at a relatively low temperature. Thus, the more liquor that passes through the exchanger from the absorber on the way to the generator, the greater will be the amount of heat exchange taking place within the exchanger and accordingly the temperature of the liquor entering the generator will be higher as the amount of liquor flowing therein by means of the exchanger increases. Accordingly as less liquor passes from the absorber through the exchanger, less heat loss of the liquor leaving the exchanger on its way to the absorber takes place and therefore the temperature of the liquor within the preheating coil 18 will be higher than if the amount of heat exchange in the exchanger is at a maximum. The temperature of the coil 18 is therefore controlled by the valve 49, the temperature increasing as the amount of liquor which is by-passed from the absorber directly to the generator increases. Accordingly as the temperature of the mixed air decreases, valve 49 is caused to move to a position wherein the proportion of liquor by-passed by the exchanger to the liquor passing from the absorber through the exchanger increases, this valve being controlled by the bulb 70 as previously described. Coil 18 will be controlled to maintain a mixed air temperature slightly above that at which the fresh air dampers begin to move towards closed position for example, 62°. If the mixed air temperature should fall to 60° with valve 49 in such position that no liquor from the absorber on the way to the generator passes through the exchanger, the amount of heat given off by coil 18 will be at a maximum for a given generator temperature, and dampers 17 will be moved towards closed position an amount sufficient to maintain a mixed air temperature at 60°. It is desirable to circulate a certain amount of fresh air through the system to provide proper ventilation and therefore, the fresh air dampers are maintained open a certain amount at all times until the temperature drops to such a low value that it is not possible or practical to supply enough heat thereto to maintain the space being heated at a desired value.

As the temperature within the space being heated rises or falls, the valve 80 moves towards open or closed position a proportionate amount as heretofore described thus permitting more or less steam to pass through the generator. In this manner the temperature of the main heating coil 19 is controlled directly by the room temperature. It will be noted that the only means for cooling the absorber is the coil 18 which is cooled by the fresh air through the duct 12 so that all the heat available in the system is given up in the heating chamber. The amount of heat that is supplied to the heating chamber by the coils 18 and 19 will therefore be equal to the amount of heat taken up by the evaporator plus the amount of heat furnished to the generator by the steam coil 55. Were cooling coils provided in the absorber as in the conventional refrigeration system, it will be apparent that much of the heat in the system would not reach the heating chamber 10. By the use of coil 18 between the exchanger and the absorber in the path of the fresh air, the absorber will be kept at a sufficiently low value to permit sufficient absorption of the ammonia passing thereto from the evaporator. It is therefore important that coil 18 be located in the fresh air duct, instead of being located in a portion of the heating chamber where the fresh and return air is mixed, in order that maximum cooling of coil 18 and therefore of the absorber will take place.

Were it not for the by-pass 52, the temperature of the coil 18 would not be as high as it will be when some or all of the liquor is by-passed, with the result that more heat would have to be supplied to the coil 19 to compensate for the lower temperature of the coil 18 for a given setting of the dampers 16 and 17. The amount of heat that can be supplied by the coil 19 is limited however by the pressure that it is safe to maintain with the generator. It will be apparent that as the amount of heat exchange in the exchanger decreases, that a greater supply of steam will be necessary in the generator to bring the temperature therein up to the desired value, since the temperature of the liquor entering the generator decreases as the amount of heat exchange in the exchanger decreases. Accordingly by reason of the by-pass 52, the capacity of the system is increased by reason of the fact that the temperature within the coil 18 may be increased and therefore the total amount of heat given off by the coils 18 and 19 is greater than would be possible without the use of the by-pass.

During extremely cold weather, the rate of evaporation of the refrigerant in the evaporator will be relatively slow, and since the thermostatic expansion valve 59 controls the flow of refrigerant through the evaporator in a manner to prevent the flow of liquid refrigerant back to the absorber, the rate of flow of refrigerant through the system will be dependent upon the rate of evaporation of the refrigerant in the evaporator. The rate at which heat can be supplied to the air flowing through the air conditioning chamber 10 by the condenser 19 will depend upon the amount of refrigerant flowing through the system, and consequently, as the outside temperature drops, the rate of evaporation of the refrigerant in the evaporator decreases, the rate of flow of refrigerant through the system decreases, and the rate of supply of heat to the space being heated by means of the condenser 19, as well as the preheat coil 18, decreases. Accordingly, in excessively cold weather, there is a definite limitation upon the amount of heat that can be supplied by the system, even though the flow of steam to the generator 42 is high, on account of the small flow of refrigerant through the system, and insufficient heat may be supplied to the space 15.

In order therefore to increase the amount of heat supplied to the space under such conditions, it is desirable to bleed ammonia directly from the receiver into the absorber so as to increase the flow of ammonia through the system and to increase the amount of heat supplied by the condenser 19. The ammonia that by-passes the evaporator does not absorb heat from the outdoors but serves merely as a heat transfer agent to transfer heat supplied to the generator by the heating coil 55, to the condenser 19, and thereby increase the capacity of the system during very cold weather when there is a heavy demand for heat in the space or spaces being heated.

It will therefore be seen that by the use of the several controls illustrated a very effective heating system has been provided, utilizing outdoor heat for heating a space. The main heating coil is controlled directly by the room temperature, the preheating coil controlled by the temperature of the mixed air and the amount of fresh air admitted to the system is also controlled by the temperature of mixed air. The capacity of the system may be increased in extremely cold weather by a control responsive to the pressure on the outlet side of the evaporator.

It will be understood that the location of the controls may in many cases be changed without involving any invention. For example, valve 131 might be controlled by outdoor temperature instead of by the exhaust pressure in the evaporator. It will also be apparent that by the use of suitable valves and piping, interchanging the condenser and evaporator, the system may be easily converted into a cooling system in hot weather.

Having described a preferred embodiment of the invention it will be apparent that many modifications falling within the scope of the invention may be made by those skilled in the art, and I wish it to be understood that my invention is limited only by the scope of the appended claims.

I claim as my invention:

1. In a heating system for a space, the combination of a reverse cycle heating system including a generator, a condenser for liberating heat, an evaporator for absorbing heat and an absorber for producing strong liquor to be supplied to the generator from weak liquor returning from the generator, means for transferring heat from the condenser to the space to be heated, means for supplying fresh air to the air within the space, and means for liberating the heat of the weak liquor to the fresh air for preheating the same.

2. In a heating system for a space, the combination of a reverse cycle heating system including a generator, a condenser for liberating heat, an evaporator for absorbing heat, and an absorber for producing strong liquor to be supplied to the generator from weak liquor returning from the generator, means for recirculating air over the condenser through the space for heating the same, means for supplying fresh air to the recirculated air, and means for utilizing the fresh air to cool weak liquor passing to the absorber.

3. In a heating system for a space, the combination of a reverse cycle heating system including a generator, a condenser for liberating heat, an evaporator for absorbing heat, and an absorber for producing strong liquor to be supplied to the generator from weak liquor returning from the generator, means for recirculating air over the condenser through the space for heating the same, means for supplying fresh air to the recirculated air, means for liberating the heat of the weak liquor to the fresh air for preheating the same, and means responsive to the temperature of the mixture of fresh and recirculated air for controlling the amount of heat transfer from the weak liquor to the fresh air.

4. In a heating system for a space, the combination of a reverse cycle heating system including a generator, a condenser for liberating heat, an evaporator for absorbing heat, and an absorber for producing strong liquor to be supplied to the generator from weak liquor returning from the generator, means for recirculating air over the condenser through the space for heating the same, means for supplying fresh air to the recirculated air, means for liberating the heat of the weak liquor to the fresh air for preheating the same, and means responsive to the temperature of the mixture of fresh and recirculated air for regulating the amount of fresh air mixed with the recirculated air.

5. In a heating system for a space, the combination of a reverse cycle heating system including a generator, a condenser for liberating heat, an absorber for producing strong liquor to be supplied to the generator from weak liquor returning from the generator, and an exchanger for transferring heat from the weak liquor to the strong liquor, means for recirculating air over the condenser and through the space for heating the same, means for supplying fresh air to the recirculated air, means for liberating the heat of the weak liquor to the fresh air for preheating the same, and means responsive to the temperature of the mixture of preheated fresh air and recirculated air for controlling the amount of heat exchange that takes place within said exchanger.

6. In a heating system for a space, the combination of a reverse cycle heating system including a generator, a condenser for liberating heat, an absorber for producing strong liquor to be supplied to the generator from weak liquor returning from the generator, and an exchanger for transferring heat from the weak liquor to the strong liquor, means for recirculating air over the condenser and through the space for heating the same, means for supplying fresh air to the recirculated air, means for liberating the heat of the weak liquor to the fresh air for preheating the same, and means responsive to the temperature of the mixture of preheated fresh air and recirculated air for controlling the amount of heat exchange that takes place within said exchanger, and the amount of fresh air mixed with the recirculated air.

7. In a heating system for a space, the combination of a reverse cycle heating system including a generator, a condenser for liberating heat, an absorber for producing strong liquor to be supplied to the generator from weak liquor returning from the generator, and an exchanger for transferring heat from the weak liquor to the strong liquor, means for recirculating air over the condenser and through the space for heating the same, means for supplying fresh air to the recirculated air, means for liberating the heat of the weak liquor to the fresh air for preheating the same, means responsive to the temperature of the mixture of preheated fresh air and recirculated air for controlling the amount of heat exchange that takes place within said exchanger, and means responsive to the temperature of the air leaving said condenser for controlling the amount of heat in said condenser.

8. In a heating system for a space, the combination of a reverse cycle heating system including a generator, a condenser for liberating heat, an absorber for producing strong liquor to be supplied to the generator from weak liquor returning from the generator, and an exchanger for transferring heat from the weak liquor to the strong liquor, means for circulating air over the condenser and through the space for heating the same, means for liberating the heat of the weak liquor to the air before being heated by the condenser, and means responsive to the temperature of the air heated by the weak liquor for controlling the amount of heat exchange that takes place within said exchanger.

9. In a heating system for a space, the combination of a reverse cycle heating system including a generator, a condenser for liberating heat, an absorber for producing strong liquor to be supplied to the generator from weak liquor returning from the generator, and an exchanger for transferring heat from the weak liquor to the strong liquor, means for circulating air over the condenser and through the space for heating the same, means for liberating the heat of the weak liquor to the air before being heated by the condenser, means responsive to the temperature of the air heated by the weak liquor for controlling the amount of heat exchange that takes place within said exchanger, and means responsive to the temperature of the space being heated for controlling the heat in the condenser.

10. In a heating system for a space, the combination of a reverse cycle heating system including a generator, a condenser for liberating heat, an absorber for producing strong liquor to be supplied to the generator from weak liquor returning from the generator, and an exchanger for transferring heat from the weak liquor to the strong liquor, means for circulating air over the condenser and through the space for heating the same, means for liberating the heat of the weak liquor to the air before being heated by the condenser, and means responsive to the temperature of the air heated by the weak liquor for controlling the amount of heat exchange that takes place within said exchanger, temperature responsive means in control of the heat input to the condenser to maintain a predetermined temperature in the space being heated, and additional means in control of the heat input to the condenser for preventing the temperature of the air heated thereby from dropping below a predetermined value.

11. In a heating system for a space, the combination of a reverse cycle heating system including a generator, a condenser for liberating heat, an evaporator for absorbing heat and an absorber for producing strong liquor to be supplied to the generator from weak liquor returning from the generator, means for circulating air over the condenser and through the space for heating the same, means for heating the generator, and means responsive to the temperature of the space being heated and the temperature of the air heated by said condenser for controlling the heating means for the generator.

12. In a heating system for a space, the combination of a reverse cycle heating system including a generator, a condenser for liberating heat, an evaporator for absorbing heat and an absorber for producing strong liquor to be supplied to the generator from weak liquor returning from the generator, means for circulating air over the condenser and through the space for heating the same, heating means for the generator, means responsive to the temperature of a space being heated for controlling the heating means to maintain a predetermined temperature in said space, and additional means in control of the heating means responsive to the temperature of the air heated by the condenser for preventing the temperature of the heated air from falling below a predetermined value, regardless of the temperature of said space.

13. In a heating system for a space, the combination of a reverse cycle heating system including a generator, a condenser for liberating heat, an evaporator for absorbing heat and an absorber for producing strong liquor to be supplied to the generator from weak liquor returning from the generator, means for circulating air over the condenser and through the space for heating the same, heating means for said generator, valve means in control of the heating means, means responsive to the temperature of the space being heated for positioning said valve so that the heat input to the generator and the heat in the condenser is sufficient to maintain a predetermined temperature in the space being heated, and additional means in control of said valve to prevent the temperature of the air heated by said condenser from dropping below a predetermined value.

14. In a system of the class described including a receiver, evaporator, and absorber, connected in operative cycle, means whereby fluid may by-pass the evaporator and flow from the receiver directly into the absorber, and means in control of said last named means.

15. In a system of the class described including a receiver, evaporator, and absorber, connected in operative cycle, means whereby fluid may by-pass the evaporator and flow from the receiver directly into the absorber, and means responsive to the pressure of the fluid leaving said evaporator in control of said last named means.

16. In a heating system for a space, the combination of a reverse cycle heating system including a generator, a condenser for liberating heat, an absorber for producing strong liquor to be supplied to the generator, and an exchanger for transferring heat from the weak liquor to the strong liquor, means for recirculating air over the condenser and through the space for heating the same, means for supplying fresh air to the recirculated air before the latter passes over the condenser, damper means controlling the amount of fresh air supplied, means for liberating the heat of the weak liquor to the fresh air for preheating the same, and means responsive to the temperature of the mixed air prior to being heated by the condenser for controlling the amount of preheat of the fresh air by the weak liquor and the position of the dampers.

17. In a heating system for a space, an air conditioning unit having a heating means, means for recirculating air over said heating means and through the space to be heated, means for supplying fresh air to the recirculated air before the latter is heated by the heating means, means for preheating the fresh air prior to being mixed with the recirculated air, damper means for controlling the amount of fresh air supplied, means responsive to a drop in temperature to a predetermined value of the mixture of fresh air and recirculated air for increasing the heating effect of the fresh air preheating means to maintain the temperature substantially at the predetermined value, and means responsive to a drop in the mixture temperature to a point below this predetermined value for controlling the damper means to decrease the supply of fresh air to prevent further drop in the mixture temperature.

18. In a heating system for a space, the combination of a reverse cycle heating system including a generator, a condenser for liberating heat, an absorber for producing strong liquor to be supplied to the generator, and an exchanger for transferring heat from the weak liquor to the strong liquor, means for recirculating air over the condenser and through the space for heating the same, means for supplying fresh air to the recirculated air before the latter passes over the condenser, damper means controlling the amount of fresh air supplied, means for liberating the heat of the weak liquor to the fresh air for preheating the same, controlling means for said damper means including means responsive to the attainment of a predetermined low mixed air temperature whereby upon the attainment of this temperature, the damper means are adjusted to control the amount of fresh air supplied to prevent the temperature of the mixed air from dropping below this value, and means for normally preventing the mixed air temperature from dropping to this value including means responsive to the mixed air temperature for controlling the amount of preheat of the fresh air by the weak liquor.

19. In a heating system for a space, the combination of a reverse cycle heating system including a generator, a condenser for liberating heat, an absorber for producing strong liquor to be supplied to the generator from weak liquor returning from the generator, an evaporator for absorbing heat from an external heat source, and an exchanger for transferring heat from the weak liquor to the strong liquor, means for recirculating air over the condenser and through the space for heating the same, means for supplying fresh air to the recirculated air, a by-pass for fluid from the absorber to the generator around the exchanger, means responsive to the temperature of the mixed air prior to heating by the condenser for controlling the flow of fluid through said by-pass, a by-pass for fluid from the condenser into the absorber around the evaporator, means responsive to the pressure of the fluid leaving said evaporator for controlling the flow through said by-pass, means responsive to the temperature of the mixed air for controlling the admission of fresh air, and means responsive to the temperature of the space being heated for controlling the heat supply to the generator.

20. In a heating system for a space, the combination of a reverse cycle heating system including a generator, a condenser for liberating heat to the space being heated, an evaporator for absorbing heat and an absorber for producing strong liquor to be supplied to the generator from weak liquor returning from the generator, said evaporator being located where it is capable of absorbing heat from the outdoor air and where it is subjected to varying ambient temperatures, thermostatic expansion valve means for controlling the flow of refrigerant through the evaporator, means for conducting the evaporated refrigerant from the evaporator to the absorber, and a controlled by-pass between the high pressure side of the expansion valve and the absorber whereby an increased circulation of refrigerant is provided during periods when the temperature to which the evaporator is subjected is so low that the flow of refrigerant through the evaporator drops to a low value.

21. In a heating system for a space, the combination of a reverse cycle heating system including a generator, a condenser for liberating heat to the space being heated, an evaporator for absorbing heat and an absorber for producing strong liquor to be supplied to the generator from weak liquor returning from the generator, said evaporator being located where it is capable of absorbing heat from the outdoor air and where it is subjected to varying ambient temperatures, thermostatic expansion valve means for controlling the flow of refrigerant through the evaporator, means for conducting the evaporated refrigerant from the evaporator to the absorber, a by-pass from the condenser to the absorber around the evaporator, a by-pass valve for controlling the flow of refrigerant through said by-pass, and means responsive to the flow of the fluid through the evaporator for controlling said by-pass valve.

22. In a heating system for a space, in combination, a reverse cycle heating system including a generator, a condenser for liberating heat, an evaporator for absorbing heat and an absorber for producing strong liquor to be supplied to the generator from weak liquor returning from the generator, means for transferring heat from the generator to the space, means for supplying fresh air to the space, and means for heating the fresh air comprising means for lowering the temperature of the weak liquor flowing to the absorber.

23. In a heating system for a space, in combination, a reverse cycle heating system including a generator, a condenser for liberating heat, an evaporator for absorbing heat and an absorber for producing strong liquor to be supplied to the generator from weak liquor returning from the generator, means for transferring heat from the generator to the space, means for supplying fresh air to the space, means for heating the fresh air comprising means for lowering the temperature of the weak liquor flowing to the absorber, and thermostatic means influenced by the temperature of the fresh air for controlling the heating of the fresh air by said absorber temperature lowering means.

24. In a heating system for a space, in combination, means for passing a stream of heating medium to a space, an absorption type refrigeration system for heating said heating medium, said refrigeration system comprising a generator, a condenser, an evaporator and an absorber, said condenser being in heat exchange relationship with said medium, a heat exchanger for also heating said medium, said heat exchanger heating a portion of said medium prior to its being heated by said condenser, and means for passing weak liquor flowing from the generator to the absorber through said heat exchanger.

25. In a heating system for heating a space, in combination, duct means for passing a stream of air to the space, an absorption type refrigeration system including a condenser for heating said stream of air, said refrigeration system also comprising a generator, an evaporator for collecting heat from outside the space, and an absorber for absorbing refrigerant evaporated by said evaporator, and means for lowering the temperature of the weak liquor flowing to said absorber, said last mentioned means comprising a heat exchanger in said air stream for heating a portion of said air prior to its being heated by said condenser.

26. In a heating system for a space, in combination, a reverse cycle absorption refrigeration system including a generator for supplying vaporized refrigerant to a condenser which is in heat exchange relationship with said space, an evaporator receiving liquid refrigerant from said condenser and evaporating said refrigerant by heat collected from outside of said space, an absorber for absorbing said evaporated refrigerant and supplying strong liquor to said generator, a valve for controlling the flow of liquid refrigerant into said evaporator, control means for normally controlling the flow of refrigerant into said evaporator in accordance with the rate of evaporation of refrigerant in said evaporator, thereby limiting the flow of refrigerant through the system, and means influenced by the rate of evaporation of refrigerant in the evaporator for rendering said control means ineffective to limit the flow of refrigerant through the system for thereby providing circulation of refrigerant between the condenser and generator for heating the space, irrespective of the action of the evaporator.

27. In a heating system for a space, in combination, a refrigeration system of the type actuated by heat, said refrigeration system comprising a condenser for heating the space and condensing evaporated refrigerant, an evaporator for absorbing heat from outside the space and evaporating the condensed refrigerant, and heat actuated means for receiving evaporated refrigerant from the evaporator at low pressure and delivering it to the condenser at a higher pressure, said heat actuated means applying heat to the refrigerant, valve means for controlling the flow of refrigerant into the evaporator, control means for normally controlling the flow of refrigerant into said evaporator in accordance with the rate of evaporation of refrigerant in said evaporator, thereby limiting the flow of refrigerant through the system, and means influenced by the rate of evaporation of refrigerant in the evaporator for rendering said control means ineffective to limit the flow of refrigerant through the system for thereby providing circulation of refrigerant between the condenser and heat actuated means for heating the space, irrespective of the action of the evaporator.

WILLIAM L. McGRATH.